United States Patent
Liu et al.

(10) Patent No.: US 8,068,486 B2
(45) Date of Patent: Nov. 29, 2011

(54) METHOD AND DEVICE FOR SERVICE BINDING

(75) Inventors: Jun Liu, Shenzhen (CN); Xuejiang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 12/463,544

(22) Filed: May 11, 2009

(65) Prior Publication Data

US 2009/0213860 A1 Aug. 27, 2009

Related U.S. Application Data

(63) Continuation of application No. PCT/CN2007/070988, filed on Oct. 30, 2007.

(30) Foreign Application Priority Data

Dec. 27, 2006 (CN) .......................... 2006 1 0157769

(51) Int. Cl.
*H04L 12/28* (2006.01)
*H04L 12/56* (2006.01)
*G06F 15/173* (2006.01)

(52) U.S. Cl. .................... 370/389; 370/395.54; 709/223

(58) Field of Classification Search .......................... None
See application file for complete search history.

(56) References Cited

U.S. PATENT DOCUMENTS

| | | | |
|---|---|---|---|
| 6,912,567 B1 | 6/2005 | Allard et al. | |
| 7,881,198 B2 * | 2/2011 | Monette et al. | 370/235 |
| 2002/0027906 A1 | 3/2002 | Athreya et al. | |
| 2003/0185233 A1 * | 10/2003 | Ji et al. | 370/466 |
| 2005/0152395 A1 * | 7/2005 | Hales | 370/465 |
| 2006/0092860 A1 * | 5/2006 | Higashitaniguchi et al. | 370/255 |
| 2006/0182146 A1 | 8/2006 | Monette et al. | |
| 2006/0245436 A1 * | 11/2006 | Sajassi | 370/395.53 |
| 2006/0251055 A1 | 11/2006 | Monette et al. | |
| 2006/0264222 A1 | 11/2006 | Cole et al. | |
| 2007/0078969 A1 * | 4/2007 | Ngo et al. | 709/224 |
| 2007/0078970 A1 * | 4/2007 | Zabihi et al. | 709/224 |
| 2008/0056240 A1 * | 3/2008 | Ellis et al. | 370/352 |
| 2008/0275972 A1 * | 11/2008 | Ellis et al. | 709/223 |

FOREIGN PATENT DOCUMENTS

| | | |
|---|---|---|
| CN | 1129272 C | 7/2002 |
| CN | 1167227 C | 5/2003 |
| CN | 1416239 A | 5/2003 |

(Continued)

OTHER PUBLICATIONS

"Migration to Ethernet Based DSL Aggregation for Architecture and Transport Working Group" DSL Forum. May 2004.

(Continued)

*Primary Examiner* — Hassan Phillips
*Assistant Examiner* — Hicham Foud
(74) *Attorney, Agent, or Firm* — Brinks Hofer Gilson & Lione

(57) ABSTRACT

A method for service binding includes: identifying a service provider identifier of a terminal and binding the terminal into a corresponding tunnel dependent upon the identified service provider identifier. The present invention implements dynamic binding of a terminal with a service through identifying a service provider identifier of the terminal, which offers more flexible selection of a service by a user, a reduced operation and maintenance cost of an operator, good extensibility of a network service and facilitated deployment of the service.

20 Claims, 1 Drawing Sheet

FOREIGN PATENT DOCUMENTS

Figure 1:
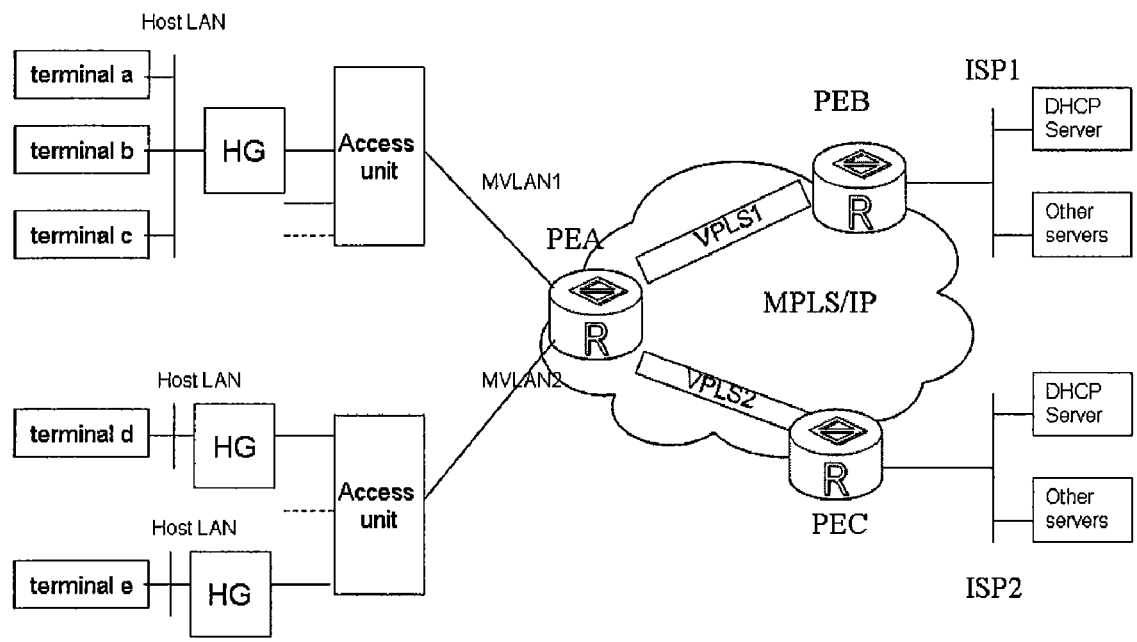

| | | |
|---|---|---|
| CN | 1701618 A | 11/2005 |
| CN | 101009627 | 8/2007 |
| CN | 101427523 B | 7/2011 |
| EP | 1826957 | 8/2007 |

OTHER PUBLICATIONS

Alexander, S. et al. "DHCP Options and BOOTP Vendor Extensions" Network Working Group. Mar. 1997.

Droms, R. "Dynamic Host Configuration Protocol" Network Working Group. Mar. 1997.

Written Opinion of the International Searching Authority issued in corresponding PCT Application No. PCT/CN2007/070988; mailed Feb. 21, 2008.

Office Action issued in corresponding Chinese Patent Application No. 200610157769.X; issued Mar. 7, 2008.

Office Action issued in corresponding Chinese Patent Application No. 200780000594.4; issued Jun. 2, 2010.

Office Action issued in corresponding European Patent Application No. 07 124 055.0; issued Oct. 28, 2009.

Moerman et al:: "Utah'S Utopia: An Ethernet-Based MPLS/VPLS Triple Play Deployment" IEEE Communications Magazine, IEEE Service Center,New York, NY vol. 43, No. 11, Nov. 2005, pp. 142-150, XP001238482; ISSN: 0163-6804.

\* cited by examiner

METHOD AND DEVICE FOR SERVICE BINDING

CROSS-REFERENCE TO RELATED APPLICATIONS

This application is a continuation of International Application No. PCT/CN2007/070988, filed on Oct. 30, 2007, which claims priority to Chinese patent application No. 200610157769.X, filed on Dec. 27, 2006, both of which are hereby incorporated by reference in their entireties.

FIELD OF THE INVENTION

The present invention relates to the field of communication technologies and in particular to a method and device for service binding.

BACKGROUND OF THE INVENTION

In Triple Play service, there are multiple service terminals in a home. At present, there are typically three terminals: one is a modem terminal for Internet service, one is a Set Top Box (STB) terminal for TV service, and another is a Voice over Internet Protocol (VoIP) terminal for Voice service. Different terminals have access to network equipment of an operator through a same network device, such as a Customer Premise Equipment (CPE) and a Home Gateway (HG).

A Triple Play user may have access to a network of a Network Service Provider (NSP) through a fixed line, and can be provided with a service from an Internet Service Provider (ISP). A currently used method is such that the NSP batch-dispatches fixed users to the ISP corresponding to the users directly with lines of the users through a tunnel, such as a Virtual Private LAN Service (VPLS), Mac in Mac, and QinQ. As an increasing number of ISPs provide the Triple Play service for end users, this fixed line based batch-dispatch makes it very difficult for the NSP to accomplish extensibility of a network and facilitated deployment of a service.

The DSL forum has proposed a method by which a personal service can be transferred transparently through a tunnel to a remote service processing device of the ISP, such as a Provider Edge (PE) device with provision of a data service, a TV service, and a VoIP service. by binding of the user (layer-1 Q or layer-2 Q) with the VPLS or a Virtual Local Area Network (VLAN) tunnel through static configuration, by mapping the VLAN having access to a user into the corresponding VPLS, or by the N:1 method for VLAN.

In the Triple Play service, however, an end user may select different ISPs, provided that the user and an ISP reach an agreement with respect to the selection of the ISP. Typically, an ISP identifier is set directly in a terminal device (e.g., a set top box) to distinguish the ISP. A network service provider typically has already established for different ISPs Multi-Protocol Label Switching Virtual Private Network (MPLS VPN) channel (such as VPLS) for transferring transparently something to the end user, which inevitably requires that those different terminals in the family have to be online by adopting a same port, VLAN or inner layer or outer layer VLAN. This method may be limited largely in practical operation due to stringent and inflexible network planning. Additionally, this method requires strong association of a user with his physical location. Once a service provider is changed, the network has to be planned over again or configuration of an access device has to be changed, which may be disadvantageous to practical operation due to a high maintenance cost.

SUMMARY OF THE INVENTION

Embodiments of the invention solve the problem of batch-dispatching of multiple dynamic ISP services.

An embodiment of the invention provides a method for service binding. The method includes identifying a service provider identifier of a terminal and binding the terminal into a corresponding tunnel according to the identified service provider identifier.

An embodiment of the invention further provides a device for service binding. The device includes an identification module adapted to identify a service provider identifier of a terminal and a binding module adapted to bind the terminal into a corresponding tunnel according to the identified service provider identifier.

According to the embodiments of the present invention, dynamic binding of a terminal with a service is implemented through identifying a service provider identifier of the terminal, thereby offering more flexible selection of a service for the end user, a reduced operation and maintenance cost of an operator, good extensibility of a network service and facilitated deployment of the service.

BRIEF DESCRIPTIONS OF THE DRAWINGS

FIG. 1 is a schematic diagram of networking according to embodiments of the invention.

DETAILED DESCRIPTIONS OF THE EMBODIMENTS

The key regarding how an access device of a network service provider automatically discovers a binding relationship of an user terminal with an ISP, dynamically binds them, and therefore implements dynamic distribution of ISP services lies in that, instead of static configuration of a binding relationship of a terminal physical location with an MPLS VPN channel, the end user and the ISP can be dynamically associated by information on a user account, or information with special meaning (for example, the information can be acquired in a network access negotiation message of the user). Therefore, after the user selects different ISP operators, a service can be transferred transparently to a corresponding ISP if only a terminal or an ISP identifier in the terminal is modified in response to a request from the ISP (the terminal can carry ISP identification information during network access negotiation, and a upstream network device can identify an ISP from the ISP identification information) without planning or configuration over again of networking.

The invention is further described in detail as follows according to embodiments and drawings to make the objects, solutions and advantages of the invention more apparent.

A user device typically acquires an IP address through the Dynamic Host Configuration Protocol (DHCP), thereby having access to a network and requesting for a service. Therefore, the user terminal can carry ISP identification information of the requested service when initiating a DHCP negotiation request for a network access, thereby dynamically binding the user with an ISP.

There is an Options field in the structure of a DHCP message, and this field is an optional parameter field and can carry multifarious rich information. The DHCP Option 60 is a Vendor class identifier option defined in the RFC 2132 and is in a message format as follows:

| Code | Len | Vendor class Identifier |
|------|-----|-------------------------|
| 60   | n   | i1 i2 ...               |

As illustrated in FIG. 1 which is a schematic diagram of networking according embodiments of the invention, an ISP1 and an ISP2 represent two service providers both of which can provide various content services, such as Video on Demand (VOD), stream media, voice, and data. An operator provides the ISPs with an infrastructure network facility service, for example, provides a channel service through VPLS. As illustrated in FIG. 1, a tunnel transparent transfer service is provided for the ISP1 through VPLS1 between a PEA and a PEB, and for the ISP2 through VPLS2 between the PEA and a PEC. Also, the PEA, the PEB and the PEC enable user management on behalf of the ISPs, and provide service such as user access, authentication, and billing. Listed in FIG. 1 are three terminals, a terminal a, a terminal b and a terminal c in one home, and two terminals, a terminal d and a terminal e in another home. These terminals have access to devices of an operator network through a home network equipment (CPE or HG), and further transfer transparently to the PEB and the PEC through the VPLS network between the PEs. The PEB and the PEC are in turn connected to various servers of the ISP, such as a DHCP Server, a File Transfer Protocol (FTP) server, and a VOD server.

A detailed solution for dynamically binding into a VPLS tunnel (or another layer-2 tunnel, such as a Mac in Mac tunnel, and a VLAN layer-2 tunnel) on the basis of the DCHP Option 60 so as to implement service binding is described below.

The PEA establishes a management VLAN (a dedicated VLAN with a management function, i.e. an MVLAN) on the device to which the user has access, such as an MVLAN1 and an MVLAN2. The management VLAN corresponds to the ISP. VPLS tunnels, i.e. VPLS1 and VPLS2, are established in advance respectively for the ISP1 and the ISP2 on the management VLANs, which may be identified on the PEA with VSI-ISP1 and VSI-ISP2, respectively. The VSI (Virtual Switching Instance) identifiers are identical to the ISP identifiers configured for the user terminal by the ISPs. The user may have an access through either layer-1 Q or layer-2 Q (QinQ).

The main function of the management VLAN is to create a correspondence relationship between the VLAN interface and the ISP, thereby creating the VPLS tunnel corresponding to the ISP. The management VLAN can be replaced by any entity which has the same function as the management VLAN.

In the user terminal or the CPE or HG, an ISP identifier for network access is added according to configuration of the ISP. This identifier, simply referred to as a service provider identifier hereinafter, is carried through the DHCP Option 60.

When initiating a DHCP negotiation request during the process of network accessing, the user terminal carries the ISP identifier in the DHCP Option 60, and sends the ISP identifier to the PEA.

The PEA acquires the ISP identifier in the DCHP negotiation message from the user through DHCP Snooping, and determines whether it matches a VSI-ISP identifier already configured. If it does not match, then the PEA discards the message. If it can match a VSI-ISP identifier, then the PEA adds dynamically the user into the VPLS tunnel, and transfers transparently the DHCP message to a corresponding ISP in the VPLS tunnel.

Upon snooping about and acquiring the DHCP Option 60 for the first time, the PEA creates for the user various control table items related to service message forwarding, which include a table item of binding of a VSI with a VLAN (either layer-1 Q or layer-2 Q) to which the user has access, a table item of learning of a user source MAC address, and a table item of binding of IP, VLAN, MAC, and PORT (the VLAN may be either layer-1 Q or layer-2 Q). The table item of binding of a VSI with a VLAN to which the user has access is used for implementing dynamic binding of the user with a VPLS tunnel, the table item of learning of a user source MAC address is used for forwarding various messages from the ISP to the user by the VPLS, and the table item of binding of IP, VLAN, MAC, and PORT can be used for security check of the user to prevent an illegal user from being an impostor, and can also be used for preventing the user from applying for excessive IP addresses.

Dynamic binding of the user terminal with an ISP service is implemented through the above steps, and thus the user terminal can transmit /receive normally a service message to/from the ISP.

More preferably, after the user is authenticated and gains a network access, an automatic aging period is set on the PEA for the table item of binding of a VSI with a VLAN to which the user has access. This can be accomplished through either adding an option Lease Time or multiplexing an option 51 in the DHCP protocol. In other words, when the option 60 and the option 51 coexist, an IP Address Lease Time of the DHCP is regarded as an aging period of binding of the user with an ISP. The period of the option 51 can be set in a length of 32 bits and in second.

After the user terminal terminates the network access, the table item of learning on a user source MAC address and the table item of binding of IP, VLAN, MAC, and PORT on the PE age automatically.

More preferably, in order to prevent that the MAC address of an ISP server has not been learned on the PEA when a user visits an ISP, the ISP shall send periodically gratuitous Address Resolution Protocol (ARP) message in a VSI for various servers. This function can be supplied by a PE device or a Broadband Access Server (BAS) device at the ISP side. Also, the PEA shall broadcast the gratuitous ARP message in the user VLAN. For QinQ, the PEA can broadcast the gratuitous ARP message in outer Q, and then a lower-layer joining device can duplicate the gratuitous ARP message in inner Q.

More preferably, the PE at the ISP side can also function as a BAS (the BAS can also be disposed outside of the PE) which issues periodically an ARP probing message to the user in order to detect whether the user with a network access is online. In this case, the PE at the user side (e.g., the PEA) may be faced with a problem of broadcasting of all of a huge number of users in the VSI, which may result in a broadcast storm. In order to avoid this problem, the PE at the user side first searches for a table item of binding of IP, VLAN, MAC, and PORT according to binding of IP and VLAN upon reception of the ARP probing message. If the table item is found, then the PE can locate a specific port, and forward the ARP message to the port. If the table item can not be found, which indicates that the user has already been offline, then the PE discards the ARP message. The aging period of the table item of binding of IP, VLAN, MAC, and PORT can be set a little longer than the period of the ARP probing message in order to prevent a misreport.

Further in the present embodiment, VPLS can be replaced either by Virtual Private Wire Service (VPWS) or Pseudo Wire Emulation Edge-to-Edge (PWE3) or by other layer-2 technologies, such as Mac in Mac and a layer-2 VLAN switching network.

A device embodiment includes a tunnel establishing module, an identification module, a binding module, a table item control module, and an aging module.

The tunnel establishing module is adapted to establish a management VLAN and establish a tunnel through the management VLAN, which is described as follows with reference to FIG. 1.

The tunnel establishing module establishes a management VLAN (MVLAN), such as an MVLAN1 and an MVLAN2. The management VLAN corresponds to an ISP service provider identifier. VPLS tunnels, i.e. VPLS1 and VPLS2, are established in advance respectively for an ISP1 and an ISP2 on the management VLANs, which are identified on the PEA with VSI-ISP1 and VSI-ISP2, respectively. The VSI identifiers are identical to the ISP identifiers configured for the user terminal by the ISPs. The user terminal can have an access through either layer-1 Q or layer-2 Q (QinQ).

The identification module is adapted to identify a service provider identifier of the terminal and determine a management VLAN according to the identifier. Specifically, the module acquires an ISP identifier in a DHCP negotiation message from the user through DHCP Snooping, and determines whether it matches a VSI-ISP identifier already configured. If it does not match, then the module discards the message. If it can match a VSI-ISP identifier, then the module can find a corresponding management VLAN.

The binding module is adapted to bind the terminal into a corresponding tunnel according to the identified service provider identifier. In other words, the module identifies a corresponding ISP tunnel according to the determined management VLAN, and binds dynamically the user terminal into the VPLS tunnel, so that the module can transfer transparently a DHCP message to a corresponding ISP in the VPLS tunnel.

The table item control module is adapted to create a related table item according to a result from the binding module. Specifically, upon snooping about and acquiring the DHCP Option 60 for the first time, the module creates for the user various control table items related to service message forwarding, which include a table item of binding of a VSI with a VLAN (either layer-1 Q or layer-2 Q) to which the user has access, a table item of learning of a user source MAC address, and a table item of binding of IP, VLAN, MAC, and PORT (the VLAN may be either layer-1 Q or layer-2 Q).

The aging module is adapted to age the table item of the control table.

The embodiments accomplish dynamic binding of a terminal with an ISP service through identifying a service provider identifier of the terminal, thereby resulting in more flexible selection of a service for the end user, a reduced operation and maintenance cost of an operator, good extensibility of a network service and facilitated deployment of the service.

The above descriptions are merely illustrative of the embodiments of the invention, and the protection scope of the present invention shall not be limited to those. Variations or substitutions which can readily occur to those skilled in the art in light of the invention shall be encompassed in the protection scope of the present invention. Accordingly, the protection scope of the present invention shall be defined in accordance with the appended claims.

What is claimed is:

1. A method for service binding, comprising:
identifying a service provider identifier of a terminal; and
binding the terminal into a corresponding tunnel according to the service provider identifier;
wherein binding the terminal into a corresponding tunnel according to the service provider identifier comprises:
determining a management VLAN according to the service provider identifier; and
identifying the corresponding tunnel according to the determined management VLAN, binding dynamically the terminal into the corresponding tunnel, and transferring transparently in the tunnel a message sent from the terminal to an Internet Service Provider corresponding to the tunnel.

2. The method according to claim 1, wherein before identifying a service provider identifier of a terminal, the method further comprises:
establishing the management Virtual Local Area Network, VLAN, through which the tunnel corresponding to the Internet Service Provider is established.

3. The method according to claim 1, wherein
the service provider identifier is carried in a negotiation request initiated by the terminal during the process of network accessing.

4. The method according to claim 3, wherein the negotiation request is carried in a Dynamic Host Configuration Protocol, DHCP, request message, and the service provider identifier is set in a field of DHCP option 60.

5. The method according to claim 3, wherein upon snooping about and acquiring the negotiation request carrying the service provider identifier, the method further comprises creating a control table item for service message forwarding.

6. The method according to claim 5, wherein the control table item for service message forwarding comprises a table item of binding of a Virtual Switching Instance, VSI, with a VLAN to which the terminal has access and a table item of learning of a terminal source Media Access Control, MAC, address.

7. The method according to claim 6, wherein the control table item further comprises a table item of binding of Internet Protocol IP, VLAN, MAC, and PORT.

8. The method according to claim 1, further comprising issuing periodically a gratuitous Address Resolution Protocol, ARP, message, which is broadcast in a user VLAN.

9. The method according to claim 8, wherein an entity which issues periodically a gratuitous ARP message is an Internet Service Provider, ISP; or a Provider Edge, PE, device; or a Broadband Access Server, BAS, at the ISP side.

10. The method according to claim 7, wherein upon reception of an ARP probing message, a PE at a user side searches for the table item of binding of IP, VLAN, MAC, and PORT according to binding of IP and VLAN; and if the table item is found, the PE forwards the ARP probing message to a port to detect whether the terminal is online; otherwise, the PE discards the ARP probing message.

11. A Provider Edge, PE, device for service binding, comprising:
hardware configured to implement an identification module, adapted to identify a service provider identifier of a terminal; and
hardware configured to implement a binding module, adapted to bind the terminal into a corresponding tunnel according to the identified service provider identifier;
wherein bind the terminal into a corresponding tunnel according to the service provider identifier comprises;
determine a management VLAN according to the service provider identifier; and
identify the corresponding tunnel according to the determined management VLAN, bind dynamically the terminal into the corresponding tunnel, and transfer transparently in the tunnel a message sent from the terminal to an Internet Service Provider corresponding to the tunnel.

12. The device according to claim 11, further comprising: a tunnel establishing module, adapted to establish the management VLAN through which tunnel corresponding to the Internet Service Provider is established.

13. The device according to claim 12, further comprising: a table item control module, adapted to create a control table item for service message forwarding.

14. The device according to claim 13, wherein the control table item for service message forwarding comprises a table item of binding of a VSI with a VLAN to which the terminal has access and a table item of learning on a terminal source MAC address.

15. The device according to claim 14, wherein the control table item further comprises a table item of binding of IP, VLAN, MAC, and PORT.

16. The device according to claim 14, further comprising: an aging module, adapted to perform an aging control on the table item of the control table.

17. The device according to claim 16, further comprising: an Address Resolution Protocol ARP message broadcasting module, adapted to send periodically gratuitous ARP message in a user VLAN.

18. The device according to claim 17, further comprising: an ARP probing message processing module, adapted to search for the table item of binding of IP, VLAN, MAC, and PORT according to binding of IP and VLAN upon reception of the ARP probing message, to forward the ARP probing message to a port if the table item is found to detect whether the terminal is online and discard the ARP probing message if the table item is not found.

19. A Provider Edge, PE, device for service binding, comprising:
an identification module, adapted to identify a service provider identifier of a terminal; and
a binding module, adapted to bind the terminal into a corresponding tunnel according to the identified service provider identifier;
wherein the service provider identifier is carried in a negotiation request initiated by the terminal during the process of network accessing; and the negotiation request is carried in a Dynamic Host Configuration Protocol, DHCP, request message, and the service provider identifier is set in a field of DHCP option 60.

20. A method for service binding, comprising:
identifying a service provider identifier of a terminal; and
binding the terminal into a corresponding tunnel according to the service provider identifier;
wherein the service provider identifier is carried in a negotiation request initiated by the terminal during the process of network accessing; and the negotiation request is carried in a Dynamic Host Configuration Protocol, DHCP, request message, and the service provider identifier is set in a field of DHCP option 60.

* * * * *